United States Patent
Deguchi et al.

(10) Patent No.: US 10,036,104 B2
(45) Date of Patent: Jul. 31, 2018

(54) METHOD FOR PRODUCING ABRASION RESISTANT POLYESTER FIBER

(71) Applicant: Asahi Kasei Fibers Corporation, Osaka-shi, Osaka (JP)

(72) Inventors: Junko Deguchi, Tokyo (JP); Hiroshi Nishizaki, Tokyo (JP); Yoshimasa Notsu, Tokyo (JP)

(73) Assignee: ASAHI KASEI FIBERS CORPORATION, Osaka (JP)

( * ) Notice: Subject to any disclaimer, the term of this patent is extended or adjusted under 35 U.S.C. 154(b) by 276 days.

(21) Appl. No.: 14/918,236

(22) Filed: Oct. 20, 2015

(65) Prior Publication Data

US 2016/0040321 A1   Feb. 11, 2016

Related U.S. Application Data

(62) Division of application No. 13/812,688, filed as application No. PCT/JP2010/062839 on Jul. 29, 2010.

(51) Int. Cl.
   *D01D 5/08*  (2006.01)
   *D01D 5/088* (2006.01)
   (Continued)

(52) U.S. Cl.
   CPC ............ *D01F 6/62* (2013.01); *B29C 47/0004* (2013.01); *B29C 47/0014* (2013.01);
   (Continued)

(58) Field of Classification Search
   CPC ............ D01D 5/08; D01D 5/088; D01D 5/12; D01D 5/16; D01D 5/22; D01D 7/00;
   (Continued)

(56) References Cited

U.S. PATENT DOCUMENTS

| 2,556,295 A | 6/1951 | Pace, Jr. |
| 6,623,853 B2 | 9/2003 | Branum et al. |

(Continued)

FOREIGN PATENT DOCUMENTS

| EP | 1 154 055 A1 | 11/2001 |
| EP | 1 188 848 | 3/2002 |

(Continued)

OTHER PUBLICATIONS

English-language International Search Report from the Japanese Patent Office dated Nov. 9, 2010, for International Application No. PCT/JP2010/062839.

(Continued)

*Primary Examiner* — Leo B Tentoni
(74) *Attorney, Agent, or Firm* — Finnegan, Henderson, Farabow, Garrett & Dunner, LLP

(57) ABSTRACT

Provided is an abrasion-resistant polyester fiber, which has, in particular, a strength within a specific range, an elongation within a specific range and a Young's modulus falling within a specific range in a specific elongation range on a stress-strain curve, to improve the abrasion resistance of a woven/knitted product for clothing using, in particular, a fine size polyester fiber. The polyester fiber is an abrasion-resistant polyester fiber comprising ethylene terephthalate as a main repeating unit, characterized by satisfying the following requirements: (1) the fineness being from 8 dtex to 200 dtex inclusive; (2) the single yarn fineness being from 1.0 dtex to 4.0 dtex inclusive; (3) the breaking strength being 3.5 cN/dtex or greater; (4) the breaking elongation being from 20% to 50% inclusive; and (5) the minimum differential Young's modulus being 20 cN/dtex or less in an elongation range of from 2% to 5% inclusive on a stress-strain curve of the fiber.

7 Claims, 7 Drawing Sheets

(51) Int. Cl.
*D01D 5/12* (2006.01)
*D01D 5/22* (2006.01)
*D01D 7/00* (2006.01)
*D02G 1/02* (2006.01)
*D02G 1/20* (2006.01)
*D02J 1/22* (2006.01)
*D01F 6/62* (2006.01)
*D02G 3/44* (2006.01)
*D01D 5/16* (2006.01)
*D01D 10/02* (2006.01)
*D03D 1/00* (2006.01)
*B29C 47/00* (2006.01)
*B29K 67/00* (2006.01)
*B29L 31/48* (2006.01)

(52) U.S. Cl.
CPC ........... *B29C 47/0057* (2013.01); *D01D 5/16* (2013.01); *D01D 10/02* (2013.01); *D02G 1/0206* (2013.01); *D02G 1/0213* (2013.01); *D02G 3/442* (2013.01); *D02J 1/229* (2013.01); *D03D 1/0041* (2013.01); *B29K 2067/00* (2013.01); *B29K 2995/007* (2013.01); *B29L 2031/48* (2013.01); *D10B 2331/04* (2013.01); *D10B 2501/04* (2013.01); *Y10T 442/3976* (2015.04); *Y10T 442/40* (2015.04)

(58) Field of Classification Search
CPC . D01D 10/02; D01F 6/62; D02G 1/02; D02G 1/0206; D02G 1/0213; D02G 1/20; D02G 3/442; D02J 1/22; D02J 1/229; D03D 1/0041; D10B 2331/04
USPC ....... 264/78, 103, 168, 210.5, 210.8, 211.12, 264/211.14, 342 RE; 8/489, 494, 497; 57/287
See application file for complete search history.

(56) References Cited

U.S. PATENT DOCUMENTS

| | | |
|---|---|---|
| 2006/0051576 A1 | 3/2006 | Soeda et al. |
| 2007/0202763 A1 | 8/2007 | Shibaoka et al. |
| 2008/0020173 A1 | 1/2008 | Fukunaga et al. |
| 2008/0268735 A1 | 10/2008 | Kuroda et al. |
| 2009/0308048 A1* | 12/2009 | Yanagihara ............... D01F 6/92 57/287 X |
| 2010/0104870 A1 | 4/2010 | Funatsu et al. |

FOREIGN PATENT DOCUMENTS

| | | | |
|---|---|---|---|
| EP | 2 407 583 A1 | 1/2012 | |
| EP | 2 554 722 A2 | 2/2013 | |
| JP | S62-21832 | 1/1987 | |
| JP | 62-156333 | 7/1987 | |
| JP | S63-135559 A | 6/1988 | |
| JP | 03-124676 | 5/1991 | |
| JP | 11158726 A * | 6/1999 | ............... D02J 1/22 |
| JP | 2001-164423 | 3/2001 | |
| JP | 2001-207329 | 8/2001 | |
| JP | 2003-129337 | 10/2001 | |
| JP | 2002-180332 | 6/2002 | |
| JP | 2004-27415 | 1/2004 | |
| JP | 2006-45731 A | 2/2008 | |
| JP | 2008-101295 | 5/2008 | |
| JP | 2008-240230 A | 10/2008 | |
| JP | 2010-168675 | 8/2010 | |
| JP | 2010-168685 | 8/2010 | |

OTHER PUBLICATIONS

Extended European Search Report for EP Application No. 10855319.9 dated May 2, 2014.
Japanese Patent Office, Office Action, dated May 14, 2013, issued in corresponding Japanese patent application No. 2009-012216, 3 pages.
Meiyu, Chen et al., "Effect of stretching ratio on properties of colored PET drawn yarn," *China Synthetic Fiber Industry*, vol. 26, No. 6, pp. 36-36, Dec. 2003.
Nishizaki et al., JP2010-168685 JPO machine translation, dated Aug. 5, 2010.
Office Action and Search Report for corresponding Chinese Application No. 201080068332 dated Feb. 8, 2014.
Office Action for JP Patent Application No. 2012-526254 dated Aug. 26, 2014.
Office Action in corresponding Taiwanese Patent Application No. 099125468 dated Jul. 2, 2013.
Shi Ii-mei, "Study on technology for High tenacity low shrinkage fine denier polyester filament," Master Thesis, submitted May 2005, published May 15, 2008.

* cited by examiner

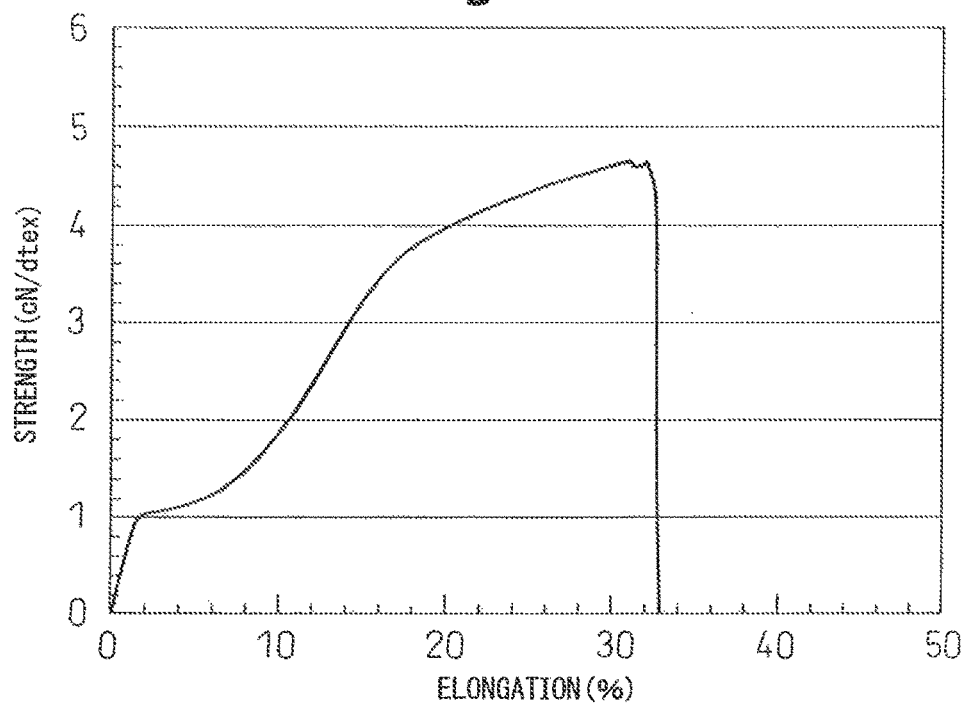
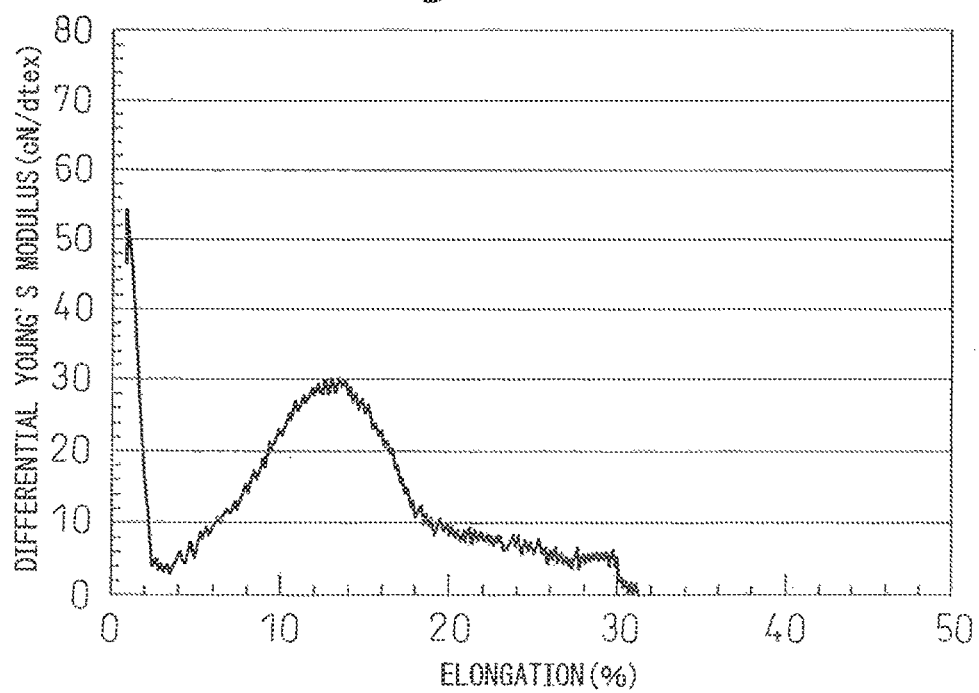

METHOD FOR PRODUCING ABRASION RESISTANT POLYESTER FIBER

This is a division of application Ser. No. 13/812,688, § 371(c) date of Jan. 28, 2013, now abandoned, which is the National Stage of PCT/JP2010/062839, filed Jul. 29, 2010, all of which are incorporated herein by reference.

TECHNICAL FIELD

The present invention relates to a polyester fiber with superior abrasion, resistance, and a woven/knitted product containing said fiber.

BACKGROUND ART

A polyester fiber represented by polyethylene terephthalate (hereafter referred to as PET) has been used in wide applications without limiting to clothing and materials, because of having superior mechanical characteristics and handling property. Accordingly there have been investigated many developments of fibers and products satisfying required characteristics in response to various kinds of applications.

In clothing and materials, composed of a woven/knitted product containing the polyester fiber, abrasion resistance is one of important characteristics required, and the woven/knitted product superior in abrasion, resistance has been required.

In the case where the polyester fiber is used mainly in a form of the woven/knitted product, in clothing, in particular, an outdoor clothing such as a windbreaker, a down jacket, there may be the case generating fuzz or tearing caused by rubbing in wearing at side parts or thigh parts. In addition, in the case where it is used particularly in an outdoor wear (a wear for outdoor activity such as for mountain climbing, camping), there may be the case generating fuzz or tearing caused by severe friction with other objects (for example, friction with a rucksack, a rope or the like, or rubbing with a ground, a cliff, a plant or the like).

In the case where the polyester fiber is used for clothing mainly in a form of a knitted product, in particular, for a sports wear such as a game shirt, pants, there may be the case generating fuzz or tearing caused by severe friction with itself or other objects (for example, contact with competitors themselves or sports goods, or contact with a ground in sliding or the like).

Generally in view of abrasion, the polyester fiber has been known to be inferior a little bit as compared with a polyamide fiber such as nylon 66, however, the polyamide fiber easily fends to generate photodegradation or yellowing, and is thus not suitable for applications to be used in outdoors under severe condition. Under such a circumstance, various investigations have been promoted to improve abrasion resistance in the polyester fiber.

Conventionally, a method has been known for obtaining a high strength polyester by increasing draw ratio. In addition, the following PATENT LITERATURE 1 has disclosed a method for obtaining a high strength polyester fiber by contriving a drawing method in producing the polyester fiber. Although yarns obtained by these production methods have high strength in a fiber axis direction, they are weak against external force from other direction such as a direction perpendicular to the fiber axis, and thus cannot provide sufficient abrasion resistance in the case where abrasion occurs from all directions such as abrasion of a clothing material.

The following PATENT LITERATURE 2 has proposed a crimped yarn superior in abrasion resistance for clothing, having a flat cross-section, with enhanced intrinsic viscosity and strength. This crimped yarn is considered to be used for clothing, having a structure with enhanced strength or orientation, and is thus brittle in a direction other than the fiber axis, and has not sufficient durability against friction caused from all directions.

Various methods for enhancing abrasion resistance, by adding additives and the like to a polymer, have also been devised. For example, the following PATENT LITERATURE 3 has proposed a fiber having enhanced orientation due to a specific crystal structure by containing special silicon oxide particles.

However, containment of such particles generally results in decrease in yarn strength. In addition, due to having a structure with enhanced orientation, it is still brittle in a direction other than the fiber axis, and is not sufficient in abrasion resistance in all directions, such as Martindale abrasion.

The following PATENT LITERATURE 4 has proposed a method for improving abrasion resistance, by performing refluxing heat treatment of 0.2 to 5% and fluid interlacing treatment after drawing a non-drawn polyester yarn, to suppress single yarn breakage and generation of fuzz caused by friction of yarns themselves of interlace yarn, which is used in a warp of the woven product, and with metal parts of a weaving machine.

However, this method is capable of suppressing, to some extent, single yarn breakage or generation of fuzz caused by friction between the yarn and a weaving machine parts in producing the woven product, it was difficult to prevent tearing caused by severe friction with clothing itself or other objects, in an wear, in particular, an outdoor wear such as a windbreaker, a down jacket, a sports wear such as a game shirt or pants, or an outdoor wear (such as a wear for outdoor activity such as for mountain climbing, camping) or the like.

In particular, in recent years, in view of good comfort derived from "lightness of cloth" (light weight per unit area of the cloth), needs for making a woven/knitted product thin cloth has been increasing. In order to make the woven/knitted product thin cloth, it may be enough to use fine size fiber, however, the finer size fiber to be used tends to decrease abrasion resistance of the woven/knitted product the more. Accordingly, in recent years, requirement for enhancement of abrasion resistance in the fine size fiber has been increasing more and more.

CITATION LIST

Patent Literature

PATENT LITERATURE 1: JP-A-4-245918
PATENT LITERATURE 2: JP-A-63-309638
PATENT LITERATURE 3: JP No. 3277703
PATENT LITERATURE 4: JP-A-58-18431

SUMMARY OF INVENTION

Problems to be Solved by the Invention

It is a technical problem to be solved by the present invention to provide an abrasion resistant polyester fiber having a specified range of strength, elongation and Young's modulus within specific elongation range in a stress-strain curve, to improve abrasion resistance of a woven/knitted product for clothing using, in particular, a fine size polyester fiber.

It is a technical problem to be solved by the present invention to provide also a woven/knitted product made of said polyester fiber, which is difficult to generate fuzz or tearing caused by rubbing at side parts or thigh parts in using as an outdoor clothing such as a windbreaker, a down jacket, in particular, which is difficult to generate fuzz or tearing caused by various frictions with a clothing itself or other objects generating in wearing as a sports or an outdoor wear, and is superior in texture.

Means for Solving the Problem

The present inventors have intensively studied a way to solve the above-described problems and found that by performing relaxation heat treatment in a specific range after drawing treatment, property of the polyester fiber, in particular, strength, elongation and differential Young's modulus in a stress-strain curve can be specified in a specific range, and the polyester fiber having improved abrasion resistance can be obtained. The present inventors have found that the woven product or the knitted product (hereafter may also be referred to as the woven/knitted product collectively) containing such a polyester fiber having improved abrasion resistance is effective in preventing tearing caused by, in particular, fierce contact with other objects.

That is, the present invention has the following aspects:

[1] A abrasion resistant polyester fiber comprising ethylene terephthalate in 95% by mole or more, as a repeating unit, characterized by satisfying the following requirements (1) to (5):
(1) a fineness is 8 dtex to 200 dtex inclusive,
(2) a single yarn fineness is 1.0 dtex to 4.0 dtex inclusive,
(3) a breaking strength is 3.5 cN/dtex or higher,
(4) a breaking elongation is 20% to 50% inclusive, and
(5) a minimum differential Young's modulus of region having an elongation of 2% to 5% inclusive in a stress-strain curve of the fiber, is 20 cN/dtex or lower.

[2] The polyester fiber according to the above [1], characterized by further satisfying the following requirement (6):
(6) a yarn abrasion strength is 0.5 time/dtex or more.

[3] The polyester fiber according to the above [1], characterized by further satisfying the following requirement (7):
(7) a limiting viscosity is 0.70 dl/g to 1.30 dl/g inclusive.

[4] The polyester fiber according to any one of the above [1] to [3], characterized by further satisfying the following requirement (8):
(8) a crystallinity is 60% to 90% inclusive, and an orientation is 0.70 to 0.92 inclusive.

[5] An abrasion resistant woven product comprising the polyester fiber according to any one of the above [1] to [4].

[6] The abrasion resistant woven product according to the above [5], wherein the woven product has a weight decrease ratio of 5% or less for 30 thousand times in the Martindale abrasion test.

[7] The abrasion resistant woven product according to the above [5] or 6, wherein the woven product has a woven product texture of ripstop taffeta.

[8] An abrasion resistant knitted product comprising the polyester fiber according to any one of the above [1] to [4].

[9] The abrasion resistant knitted product according to the [8], wherein mass per unit area, is 80 to 350 g/m$^2$ inclusive.

[10] A method for producing the abrasion resistant polyester fiber according to any one of the above [1] to [4], comprising the step of:

melt spinning a polyester having a limiting viscosity of 0.70 dl/g to 1.30 dl/g inclusive;
performing drawing treatment under a draw ratio of 65% to 85% inclusive of the limiting draw ratio; and
performing relaxation heat treatment at a heat treatment temperature of 120° C. to 220° C. inclusive, and a relaxation ratio of 5% to 15% inclusive,

[11] The method for producing the abrasion resistant polyester fiber according to the above [10], wherein the relaxation heat treatment is performed after drawing treatment and winding once.

[12] The method for producing the abrasion resistant polyester fiber according to the above [10], wherein the relaxation heat treatment is performed subsequent to drawing treatment without winding once.

[13] The method for producing the abrasion resistant woven product according to any one of the above [5] to [7], wherein the relaxation heat treatment is performed in setting at a dyeing processing step.

[14] The method for producing the abrasion resistant woven product according to the above [13], wherein the relaxation heat treatment of the woven product comprising the polyester fiber false twisted at 180 to 200° C., is performed at temperature higher than false twisting temperature.

[15] The method for producing the abrasion resistant knitted product according to the above [8] or [9], wherein the relaxation heat, treatment is performed, in setting at a dyeing processing step.

[16] The method, for producing the abrasion resistant knitted product according to the above [15], wherein the relaxation heat treatment of the knitted product, comprising the polyester fiber false twisted at 180 to 200° C., is performed at temperature equal to or higher than false twisting temperature.

Effects of the Invention

According to the present invention, the polyester fiber superior in abrasion resistance, and suitable for, in particular, a thin woven/knitted product, and a woven/knitted product containing said fiber can be obtained. The woven/knitted product using such a fiber provides a clothing which is difficult to generate fuzz or tearing caused by rubbing at underarm parts or thigh parts in wearing a clothing, in particular, in wearing an outdoor clothing such as a windbreaker, a down jacket, in particular, which is strong against severe friction with a clothing itself or other objects generating in wearing as an outdoor wear, and has superior feeling. In addition, the present invention is capable of attaining a light weight and thin cloth of cloth requiring such abrasion resistance.

In addition, use of the polyester fiber of the present invention for the knitted product is capable of providing a wear which is difficult to generate fuzz or tearing caused by rubbing at underarm parts or thigh parts in wearing a sports wear such as a game shirt, game pants, a jersey, or which is difficult to generate fuzz or tearing caused by rubbing with a ground or a floor surface in playing a game or training, and still more capable of providing the knitted product superior in suppression effect of snagging. In addition, the present invention is capable of attaining a light weight and thin cloth requiring such abrasion resistance.

BRIEF DESCRIPTION OF DRAWINGS

FIG. 1 is a stress-strain curve of the polyester yarn of the present invention (Example 2).

FIG. 2 is a differential Young's modulus-strain curve of the polyester yarn of the present invention (Example 2).

EMBODIMENTS FOR CARRYING OUT THE INVENTION

Figure 3:
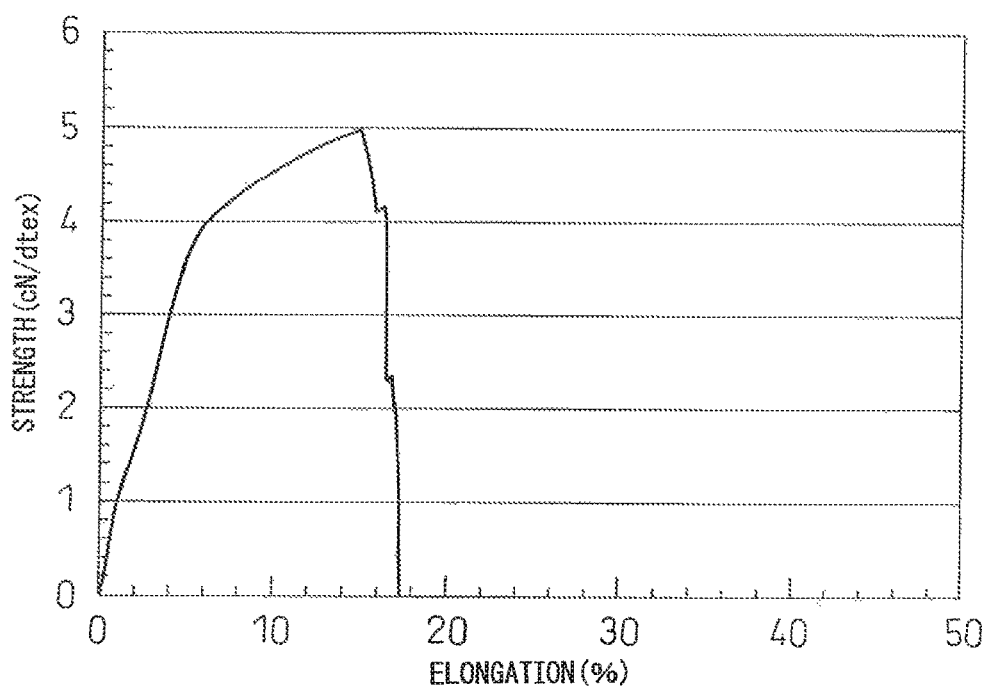
FIG. 3 is a stress-strain curve of the polyester yarn of other than the present invention (Comparative Example 8).
Figure 4:
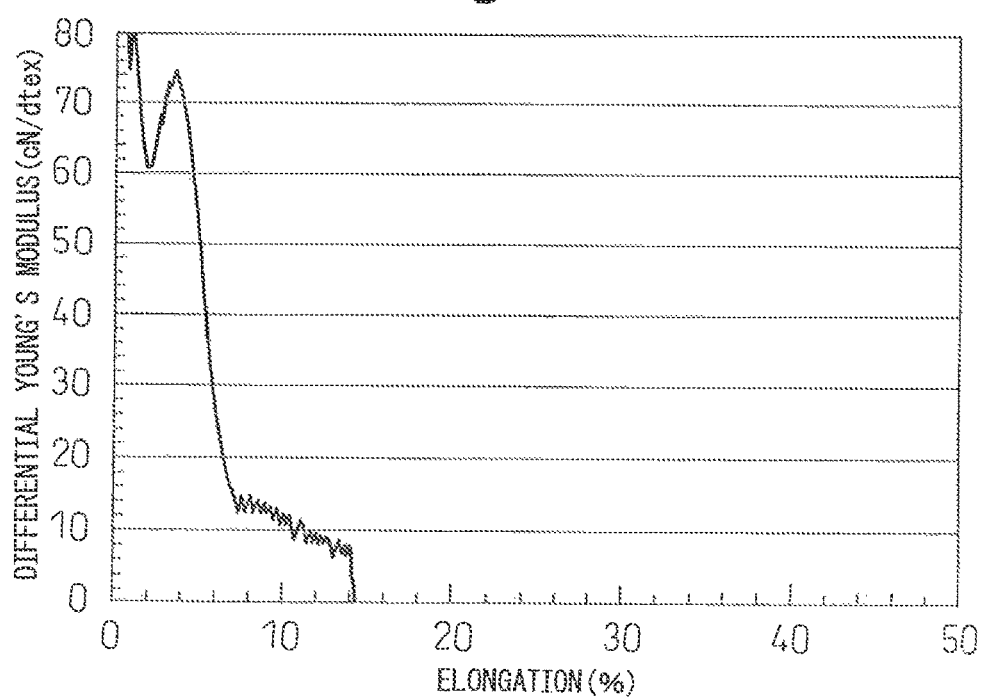
FIG. 4 is a differential Young's modulus-strain curve of other than the polyester yarn of the present invention (Comparative Example 8).
Figure 5:
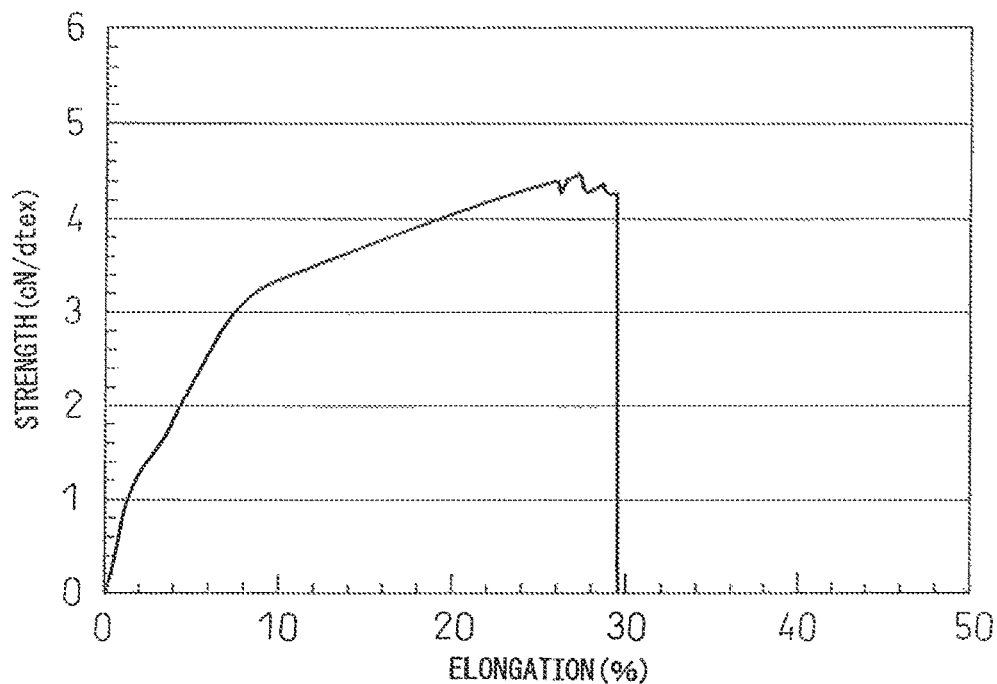
FIG. 5 is a stress-strain curve of the polyester yarn of other than the present invention (Comparative Example 9).
Figure 6:
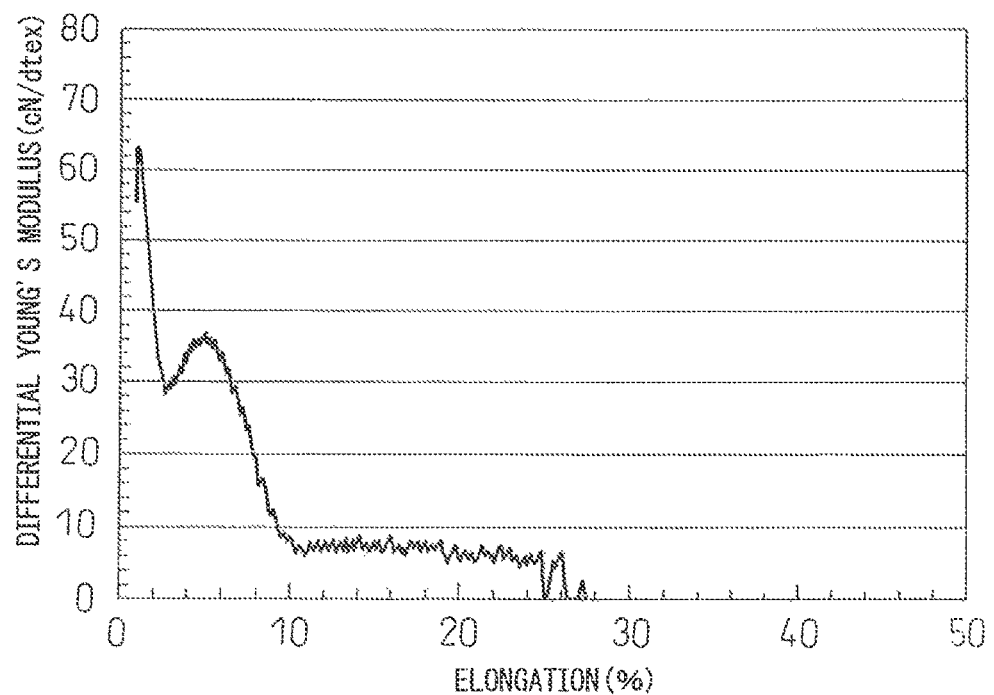
FIG. 6 is a differential Young's modulus-strain curve of other than the polyester yarn of the present invention (Comparative Example 9).

Explanation will be given below in detail on the present invention.

In the present invention, abrasion resistance means the performance of the fiber surface resisting to frictional force (shear force) in friction by other object surface. In general, a fiber incurs a phenomenon where a fibril in a single yarn appears like fuzz on the surface of the single yarn caused by friction (fibrillation). In general, generation of fibrillation decreases, for example, design, durability or the like of a cloth surface, and thus fibrillation is a not preferable phenomenon. Accordingly, in order to enhance abrasion resistance, it is a point now to prevent fibrillation.

A polyester fiber drawn under usual condition has high crystallinity, also showing a highly oriented state of molecules in a fiber length direction, however, in the polyester fiber of the present invention, by performing, for example, relaxation heat treatment in a specific range, after drawing treatment, direction of polyester molecules in fiber are disturbed, thereby degree of orientation decreases (hereafter it may also be referred to as orientation relaxation), providing property of the polyester fiber, in particular, strength, elongation and differential Young's modulus in a stress-strain curve (an S-S curve) in a specific range.

In FIG. 1, a representative stress-strain curve (an S-S curve) of the polyester fiber of the present invention is shown. As shown in FIG. 1, the polyester fiber of the present invention has a characteristic carve where a low elongation region has a flat part, and after that Young's modulus increases.

In FIG. 2, a differential Young's modulus-strain curve is shown, which is a graph obtained by differentiation of FIG. 1 on elongation. As shown in FIG. 2, the polyester fiber of the present invention has the minimum value in an elongation range of 2 to 5% inclusive, and the maximum value in an elongation range of 10 to 15% inclusive. Specifically, the minimum value of the differential Young's modulus of the yarn obtained in the present invention, in an elongation range of 2% to 5% becomes, as shown in FIG. 2, 20 cN/dtex or lower, and the maximum value in an elongation range of 10 to 15% becomes 23 cN/dtex or higher.

The polyester fiber of the present invention having such behavior of the differential Young's modulus by orientation, relaxation, is considered to little generate fibrillation, because of a large quantity of consumption of energy due to frictional force (shear force) to increase orientation of polyester molecules, when frictional force (shear force) is added at the fiber surface.

Polyester to be used for the polyester fiber of the present invention contains ethylene terephthalate in 95% by mole or more, preferably 97% by mole or higher, and more preferably 99% by mole or higher, as a main repeating unit. Ethylene terephthalate may be 100% by mole as the repeating unit, or below 5% by mole may be composed of repeating units of other esters. That is, a polymer to be used in the polyester fiber of the present invention may be a single structure of PET, or may be a copolymerized PET where below 5% by mole may be composed of repeating units of other esters.

Representative examples of copolymerization components include as follows: as an acid component, an aromatic dicarboxylic acid represented by isophthalic acid, 5-sodiosulfoisophthalic acid, an aliphatic dicarboxylic acid represented by adipic acid, itaconic acid, and the like. As a glycol component, ethylene glycol, butylene glycol, polyethylene glycol, or the like may be represented.

In addition, a hydroxyl carboxylic acid such as hydroxybenzoic acid may also be included. A plurality of these components may be copolymerized.

Still more, the polyester fiber of the present invention may contain the additives, for example, a matting agent, such as titanium oxide, a heat stabilizer, air antioxidant, an antistatic agent, an ultraviolet absorber, an antibacterial agent, various pigments, within a range not to impair the effect of the present invention, or these components may be contained by means of copolymerization.

Fineness of the polyester fiber of the present invention is 8 dtex to 200 dtex inclusive, and in using it as a woven product, it is preferably 8 dtex to 100 dtex inclusive. The further preferable range is 10 dtex to 84 dtex inclusive. The fineness below 8 dtex provides too low fineness, tending to make handling of the fiber difficult in a weaving/knitting step. The fineness over 100 dtex increases thickness of a thin woven product for clothing and provides not good feeling. Effect of the present invention is, in particular, valid also to fine fineness, exerting superior abrasion resistance, in particular, even in a thin count number of 10 to 30 dtex inclusive. Accordingly the present invention exerts superior abrasion resistance, in a light weight and thin cloth woven product, in particular, a woven product having at mass per unit area of 40 g/m$^2$ or less, using these fine fineness yarns.

On the other hand, the fineness of the polyester fiber of the present invention, in the case of using it for a knitted product, is preferably 20 dtex to 200 dtex inclusive. The more preferable range is 30 dtex to 175 dtex inclusive. The fineness below 20 dtex is too thin, and thus easily generates yarn breakage in knitting and provides inferior abrasion resistance, while the fineness over 200 dtex makes the yarn hard, and thus provides no good texture of the knitted product. Effect of the wear resistance provided with the polyester fiber of present invention is valid also to fine fineness, exerting superior abrasion resistance, in particular, even in a thin count number of 30 to 84 dtex inclusive. Accordingly the present invention exerts superior abrasion resistance, even in a light weight and thin cloth knitted product using these yarns, for example, a knitted product having a mass per unit area of 120 g/m$^2$ or less.

Single yarn fineness of the polyester fiber of the present invention is 1.0 dtex to 4.0 dtex inclusive, and preferably 1.0 dtex to 3.0 dtex inclusive. The single yarn fineness below 1.0 dtex provides inferior abrasion resistance, and on the other hand, the single yarn fineness over 4 dtex provides good abrasion resistance, however, makes the fiber hard, thus making inferior texture of the knitted, product and also easily generates skin irritation.

Breaking strength of the polyester fiber of the present invention is 3.5 cN/dtex or higher, preferably 4.0 cN/dtex or higher, and more preferably 4.5 cN/dtex or higher. The breaking strength below 3.5 cN/dtex provides inferior abrasion resistance. The breaking strength is a characteristics value which is preferable in enhancement of abrasion resistance when it is the higher, however, the breaking strength of 6.0 cN/dtex or higher makes the fiber hard and is thus not preferable in view of abrasion resistance.

Breaking elongation is 20% to 50% inclusive, and preferably 30% to 45% inclusive. The breaking elongation below 20% increases orientation of polyester molecules in the fiber, and thus easily tends to generate fibrillation and does not provide good abrasion resistance. On the other hand, the breaking elongation over 50% makes difficult to attain the breaking strength of 3.5 cN/dtex or higher, and thus does not attain the object of the present invention.

In the present invention, the minimum differential Young's modulus of region having an elongation of 2% to 5% inclusive, is 20 cN/dtex or lower, in a stress-strain curve of the fiber, preferably 2 cN/dtex to 15 cN/dtex, and more preferably 4 cN/dtex to 10 cN/dtex. When it is over 20 cN/dtex, orientation, relaxation of polyester molecules in the fiber becomes not sufficient by relaxation heat treatment, and fibrillation is generated by frictional force (shear force), and thus abrasion resistance is not preferable.

The polyester fiber of the present invention has a yarn abrasion strength by a yarn abrasion test of preferably 0.5 time/dtex or more, and more preferably a yarn abrasion strength 0.6 to 2.0 times/dtex. Yarn abrasion strength can be evaluated using a yarn abrasion test machine shown, in FIG. 10, wherein yarns are cut out in 20 cm, and several yarns are assembled, so as to attain a total fineness of about 167 dtex, and they are twisted in a degree of 10 times/m. The yarns are contacted, by applying a load of 0.14 g/dtex, with a metal bar having a diameter of 1 cm, and attached with #800 abrasive paper. By giving the yarn friction under condition of a speed of 0.6 times/sec and an amplitude of 3 cm, number of times (1 reciprocation is counted, as 1 time) till the yarn breakage is adopted as yarn abrasion times. Friction is performed in a fresh abrasive paper state, by shifting the abrasive paper by each 10 times, so that an abrasive paper state is not changed. Yarn abrasion strength is calculated by the following equation (3):

Yarn abrasion strength=Yarn abrasion times/total fineness of the yarn used in the test (3)

When the polyester fiber of the present invention is used in the woven/knitted product, it may be used as it is without twisting, or interlacing or twisting may be furnished, to increase convergence.

Description will be given next on a production method for the polyester fiber of the present invention.

It is preferable that limiting viscosity of the polyester fiber to be used in the present invention is in a range of 0.70 dl/g to 1.30 dl/g inclusive, and more preferably 0.75 dl/g to 1.10 dl/g inclusive. The limiting viscosity of 0.70 dl/g or higher is capable of improving abrasion resistance of the obtained fiber. In addition, the limiting viscosity over 1.30 dl/g makes hard feeling, although providing good abrasion resistance, and is thus not preferable as a fiber to be used in the woven/knitted product for clothing.

In producing the polyester fiber of the present invention, it is important to perform relaxation heat treatment after drawing a non-drawn yarn under a draw ratio of 65% to 85% inclusive of the limiting draw ratio, and preferably 70% to 80% inclusive. The limiting draw ratio (MD) of a non-drawn yarn is expressed by MD=(E+100)/100, provided that breaking elongation of the non-drawn yarn is (E). The case of drawing at below 65% of the limiting draw ratio makes difficult to increase breaking strength to 3.5 cN/dtex or higher, and thus cannot attain the object of the present invention. The case of drawing at over 85% of the limiting draw ratio, generates frequent yarn breakage in relaxation heat treatment.

The present invention is characterized by performing relaxation heat treatment at either of the production step of the fiber and the woven/knitted product, such as during or after spinning, during processing of the woven/knitted product or the like. By relaxation heat treatment, (the degree of) crystallinity can be increased and orientation can be suppressed. In the case of performing relaxation, heat treatment in a yarn state, during or after spinning of the fiber, it is preferable that heat treatment temperature is in a temperature range of 120° C. to 220° C. inclusive, and more preferably 150° C. to 200° C. inclusive. The temperature below 120° C. provides low orientation effect of polyester itself, and thus orientation relaxation effect of polyester molecules in the fiber is not sufficient even by combination of relaxation heat treatment, thus does not provide good abrasion resistance, while the temperature over 220° C. is close to the melting point of polyester, and thus generates frequent fuzz or yarn breakage caused by heat treatment.

It is preferable that relaxation ratio in relaxation heat treatment in a yarn state in the present invention is 5% to 15% inclusive, and more preferably 7% to 12% inclusive. The relaxation ratio is determined by the equation of relaxation ratio=((Vk−Vr)/Vk)×100, or ((V$_2$−V$_3$)/V$_2$)×100, using speed (Vk) of a supply roll 14 and speed (Vr) of a relaxation roll 16 in FIG. 8, or speed (V$_2$) of a second roll 11 and speed (V$_3$) of a third roll 20 in FIG. 9. The relaxation ratio may be determined similarly by ratio of yarn speeds (usually represented by roll speeds) before and after heat treatment, even in relaxation heat treatment using devices other than those shown in FIG. 8 and FIG. 9.

Figure 8:
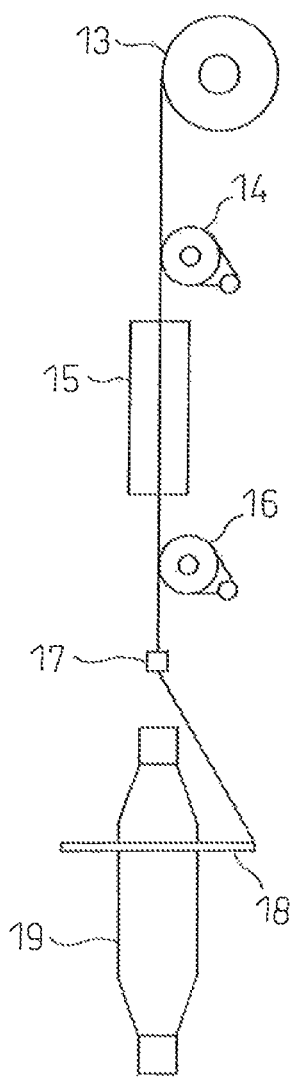
FIG. 8 is a schematic drawing showing one example of an apparatus to be used in relaxing heat treatment of a drawn yarn of the present invention.
Figure 9:
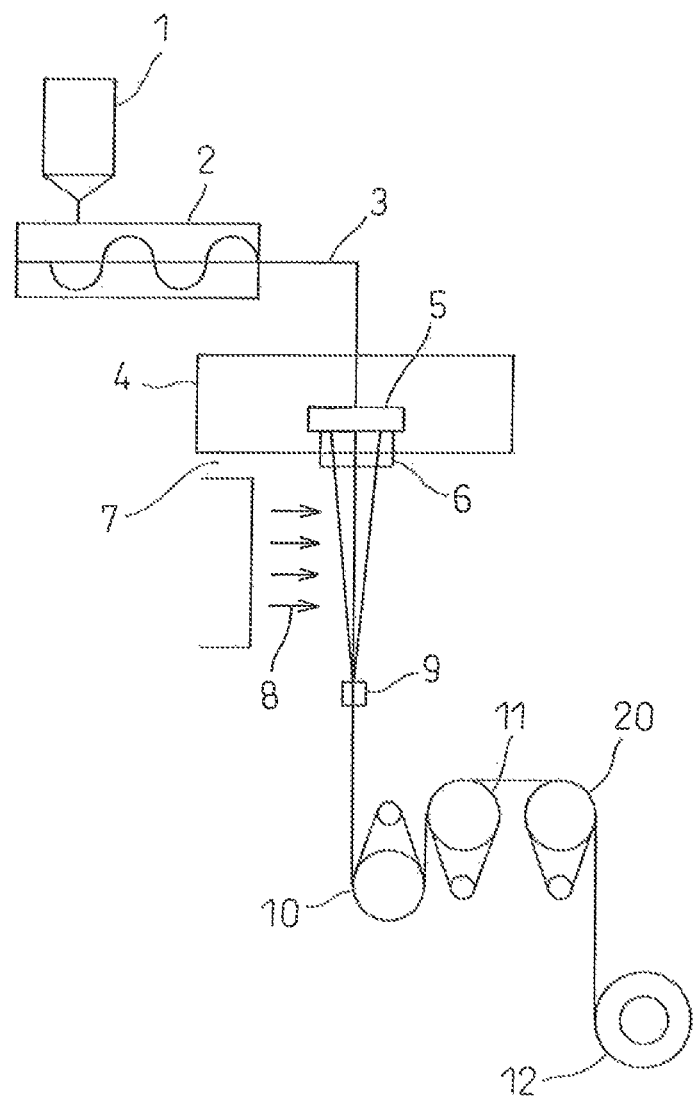
FIG. 9 is a schematic drawing showing one example of an apparatus for direct spinning, drawing and heat treatment of the present invention.

The relaxation ratio below 5% provides not sufficient orientation relaxation effect of the polyester molecules in the fiber, and does not provide good abrasion resistance, while the relaxation ratio over 15% decreases the process tension during relaxation heat treatment, providing not good spinnability, In this way, by performing relaxation heat treatment, aiming at relaxation of heat shrinkage and orientation of the polyester molecules in the fiber, after drawing, the minimum differential Young's modulus of region having an elongation of 2% to 5% inclusive, becomes 20 cN/dtex or lower, and the fiber with enhanced abrasion resistance can be obtained. The relaxation heat treatment may be performed using the apparatus shown in FIG. 8, on a fiber wound once after drawing by the spinning apparatus shown in FIG. 7, or as shown in FIG. 9, the heat treatment may be performed subsequent to drawing without winding once. Yarn tension decreases during relaxation neat treatment, however, in view of performing stable relaxation heat treatment under low tension, it is preferable to wind so that the yarn runs from upward to the downward according to gravity, as shown in FIG. 8, after once winding the yarn after drawing.

In addition, by selecting condition which provides smaller dimension of the woven/knitted product in the step of dyeing or heat set, after producing the woven/knitted product, relaxation heat treatment of the fiber in the woven/knitted product can also be performed.

When the relaxation heat treatment is performed during processing of the woven/knitted product, in the processing step of the woven/knitted, product, intermediate setting is usually performed after scouring, and after that via a dyeing step, a final setting is performed, and in this setting, in particular, in intermediate setting, it is particularly effective to make relaxing by width squeezing or warp squeezing treatment at a relatively high temperature of 170° C. to 210° C. inclusive. The width squeezing is a treatment for dimensional shrinking in a width direction of the woven/knitted product, and the warp squeezing is a treatment for dimensional, shrinking in a warp direction of the woven/knitted product. It is preferable that integration value of dimensional decreasing ratio by width squeezing or warp squeezing is 2 to 15% inclusive, relative to a dimension before the treatment, and more preferably 5 to 12% inclusive. Within this range, the polyester fiber in the woven/knitted product may be processed similarly as in relaxation treatment equivalent to a relaxation ratio of 5 to 15% inclusive, in a yarn state. As one example, in performing relaxation neat treatment under a condition of the width squeezing of 5% and the warp squeezing of 3%, dimensional, integration value after the treatment is (1−0.05)×(1−0.03)=0.9215, provided that value before the treatment is 1, and integration value of dimension change ratio becomes 7.85%, Heat treatment time is desirably 15 sec to 120 sec, and particularly desirably 30 sec to 100 sec. In addition, it is desirable to set the condition in a degree of smoothing wrinkles without tension, even, in final setting. It is important that, even in the case of performing relaxation heat treatment in the above yarn state, not to apply heat in a tensioned state, at temperature higher than temperature of relaxation heat treatment, in processing the woven/knitted product. By the relaxation, heat treatment of these yarns or the woven/knitted product, it becomes possible to decrease in orientation, while increasing crystallinity of the polyester-based fiber, and thus the woven product having extremely superior abrasion resistance can be obtained.

It is preferable that the polyester fiber of the present invention, has a crystallinity of 60% to 90% inclusive, and an orientation of 0.70 to 0.92 inclusive.

The crystallinity referred to in the present invention means a value (%) calculated by the following equation (1), by performing wide angle X-ray measurement of the polyester-based fiber, provided that intensity at θ=19.5°, as peak value of an amorphous part, is A; and intensity at θ=25.5°, as peak value of am crystalline part, is B; by drawing a base line between 2θ=5° and 40°, in a scattering intensity graph of 5°≤2θ≤40°:

$$[B/(A+B)]\times 100 \quad (1)$$

In addition, the orientation referred to in the present invention means a value calculated by the following equation (2), by performing transmission-type wide angle X-ray measurement of the polyester fiber, to determine peak intensity and a background level relative to azimuth dependency I (Φ) of diffraction intensity derived, from the (100) plane of the polyester, and to determine peak width (full width at half maximum, of the peak) at a position where intensity of I (Φ) becomes [(peak intensity−background level)/2]+background level:

$$f=1-\Delta/360 \quad (2)$$

(wherein Δ represents total (deg) of the full width at half maximum (FWHM) of the peak observed in I (Φ)). It should be noted that, in determining I (Φ), it is necessary to perform compensation required such as empty cell compensation, by performing integration of diffraction intensities in 24°<2θ<28°. As is clear from the above equation (2), in the case where crystal is completely oriented, f=1, and in the case of non-orientation, f=0.

In the case where the crystallinity is below 60%, crystallization does not proceed sufficiently, which decreases abrasion strength. In addition, the case where crystallinity is over 90% makes hard feeling, and is thus not preferable.

The orientation of 0.70 or higher is capable of exerting superior abrasion resistance, however, the orientation over 0.92 intensifies orientation which increases strength in a fiber axis direction and is effective in increasing fiber strength, but on the other hand weakens in a direction other than the fiber axis, which is not preferable for abrasion resistance in a sense of the present invention. Abrasion resistance in the present invention means superiority in abrasion resistance from every direction occurring in wearing clothes or the like, and thus abrasion resistance in every direction is required. Presence of a direction showing weak abrasion resistance is not preferable because of initiation of abrasion from that direction.

Particularly preferable ranges of the above crystallinity and orientation depend on presence or absence of false twisting. It is particularly preferable that the crystallinity of the polyester fiber without false twisting is 65% to 80% inclusive, and it is particularly preferable that the orientation is 0.70 to 0.88 inclusive. It is particularly preferable that the crystallinity of the polyester fiber with false twisting is 60% to 90% inclusive, and it is particularly preferable that the orientation is 0.85 to 0.92 inclusive.

In performing false twisting of the relaxation heat treated polyester fiber, it is preferable to perform relaxation heat treatment at a low temperature of 180 to 200° C. inclusive, and then perform the relaxation heat treat at temperature higher than false twisting temperature. In addition, also in the case of performing relaxation heat treatment, onto the woven/knitted product containing the polyester fiber after false twisting, it is similarly preferable that the relaxation heat treatment is performed at a low temperature of 180 to 200° C. inclusive. The false twisting is usually performed by applying heat of 200° C. to 210° C. inclusive in a tensioned state of the yarn. In this case, because setting temperature in post-processing is usually lower relative to false twisting temperature, sufficient exertion of relaxation effect is difficult in setting. By performing false twisting at a relatively low temperature of 180 to 200° C. inclusive, and performing relaxation heat treatment at tentative twist temperature or higher, crystallinity can be increased and orientation can be suppressed, and thus a fiber and the woven/knitted product superior in abrasion resistance can be obtained. The false twisting may be performed in either step of using one heater (1H) or two heaters (2H), and interlace processing nay be performed before or after the false twisting. In the case of the 2H false twisting, it may be enough that, temperature of a heater having higher temperature satisfies the above condition. In the false twisting, tension is applied under generally very high temperature condition, therefore crystallization proceed and orientation is increased, however, in the present invention, by controlling temperature of the false twisting and relaxation heat treatment, along with relaxation ratio, it is possible to attain the crystallinity of 60 to 90% inclusive and the orientation of 0.85 to 0.92 inclusive, even in the case of the woven/knitted product using false twisted, yarns.

Single yarn cross-sectional shape of the polyester fiber of the present invention may be a modified cross-section such as round, Y-, W-shaped one, or a hollow cross-section, or the like, but is not especially limited.

The polyester fiber of the present invention may be used alone, or in combination with the other fibers. As the other fibers to be combined, for example, the other polyester fiber, nylon, acrylic, cupar, rayon, polyurethane elastic fiber, and the like may be selected, but are not limited thereto. The woven/knitted product made of only the polyester fiber of the present invention may be allowed, however, the polyester fiber of the present invention may be contained at least one of a warp and a weft, for the woven product, and it is preferable that 30% or more of the yarns composing the warp and the weft are the polyester fiber of the present invention, more preferably 50% or more, and particularly preferably 90% or more. For the knitted product, it is preferable that a part of or all of the fibers arranged at least at the one side surface, preferably 50% or more, and particularly preferably 90% or more is the polyester fiber of the present invention.

Scouring, dyeing and finishing processing of the woven/knitted product of the present invention can be performed by a usual method, and a kind of a finishing agent may be selected, as appropriate, depending on applications of the polyester fiber to be used. However, as described above, treatment in a Pensioned state at treatment temperature in the thermal relaxation step or higher is not preferable due to impairing effect of thermal relaxation. Further performing caledering has also effect of enhancing crystallinity, and is thus very preferable.

Usually in the case of furnishing various kinds of functions to the woven/knitted product after processing, there is a problem of decreasing function by repeated wearing or washing, however, the woven/knitted product of the present invention is superior in maintaining function furnished by the above various kinds of treatment, even after repeated wearing or washing. In particular, in the case of performing water-repellent treatment for the woven product of the present invention, it has superior effect in durability of water-repellent effect.

As a weave texture in using the polyester fiber of the present invention as the woven product, including a plain weave texture, a twill weave texture, or a satin weave texture, and various kinds of derivative textures derived therefrom may be applicable, however, a taffeta texture, in particular, a ripstop taffeta texture is preferable, because of having extremely superior abrasion resistance by abrasion durability effect by the rip part.

As a knitted texture in using the polyester fiber of the present invention as the knitted product, either of circular knitting or warp knitting may be applicable. In particular, a knitted texture such as a four-stage smooth, where snagging easily occurs, shows also snagging improving effect, and may be used suitably.

It is preferable that the woven product of the present invention has a weight decrease ratio of 5% or less for 30 thousand times in the Martindale abrasion test, more preferably 3% or less for 30 thousand times, and still more preferably 1% or less for 30 thousand times. In observing an abrasion state in practical wearing of the woven product for clothing, it is found very close in a damaged state in abrasion evaluation by the Martindale method, and thus it is effective to enhance strength in the Martindale abrasion, to enhance abrasion resistance in wearing.

It is preferable that the knitted product of the present invention has abrasion resistance, by the ART abrasion test, ranked N (none) or L (low). The abrasion state in practical wearing of the knitted product for clothing may be evaluated using the ART abrasion test, and thus it is effective to enhance strength in the ART abrasion, to enhance abrasion resistance in wearing.

The woven/knitted product of the present invention is superior in texture and abrasion resistance, and is thus applicable to various fields for clothing. In particular, it is suitable for an outerwear such as a windbreaker, a down jacket, a sports wear, an outdoor wear which in many cases is subjected to severe rubbing with a clothing itself or other objects, in wearing. Among them, it is suitable for a sports wear or an outdoor wear which in many cases is worn at severe surroundings and subjected to severe rubbing with others. In addition, the woven/knitted product of the present invention, has characteristics of having superior abrasion resistance irrespective of being a thin cloth and light weight, and is therefore usable particularly suitably as the above clothing having a thin cloth and light weight.

It is preferable that the woven product of the present invention has a mass per unit area of 20 to 80 $g/m^2$ inclusive. The mass per unit area within this range is capable of providing the woven product superior in abrasion resistance, while maintaining woven product performance required in clothing applications. In the present invention, also the woven product using, in particular, the polyester fiber with a fineness of 10 to 33 dtex has superior abrasion resistance. As the result, even a light weight and thin woven product using these yarns, for example, a woven product having the mass per unit area of 44 $g/m^2$ or lower, has superior abrasion resistance, and is thus capable of satisfying both thinning/weight reduction and enhancement of abrasion resistance.

It is preferable that the knitted product of the present invention has a mass per unit area of 80 to 350 $g/m^2$ inclusive. The mass per unit area within this range is capable of providing the knitted product superior in abrasion resistance, while maintaining knitted product performance required in clothing applications. In the present invention, also the knitted product using, in particular, the polyester fiber with a fineness of 30 to 84 dtex inclusive has superior abrasion resistance. As the result, even a light weight and thin knitted product, for example, a knitted product having the mass per unit area of 120 $g/m^2$ or lower, has superior abrasion resistance, and is thus capable of satisfying both thinning/weight reduction and enhancement of abrasion resistance.

EXAMPLES

Explanation will be given below specifically on the present invention with reference to EXAMPLES, however, the present invention should not be limited at all to these EXAMPLES.

It should be noted that measurement methods and evaluation methods used are as described below.

(1) Fineness, Breaking Strength and Breaking Elongation

They were measured under the following condition, based on JIS-L-1013 (A test method for chemical fiber filament yarn):

Test piece length: 200 mm

Tension rate: 200 mm/min

Number of measurements: 5 times/sample (2) The Minimum Differential Young's Modulus Breaking strength was measured similarly as in the above (1). The minimum value of differential Young's modulus, in an elongation region of 2% to 5% inclusive was used as the minimum differential Young's modulus, from the differential Young's modulus curve obtained by differentiation of stress at each point by elongation, using measurement value of stress-elongation by each 0.25 second.

(3) Limiting Viscosity

A sample polymer was dissolved in o-chlorophenol (hereafter abbreviated as OCP) to determine relative viscosity ηr in multiple dilutions, using an Ostwald viscometer at a temperature of 25° C., and by extrapolation to infinite dilution, limiting viscosity was determined.

(4) Limiting Draw Ratio

Figure 7:
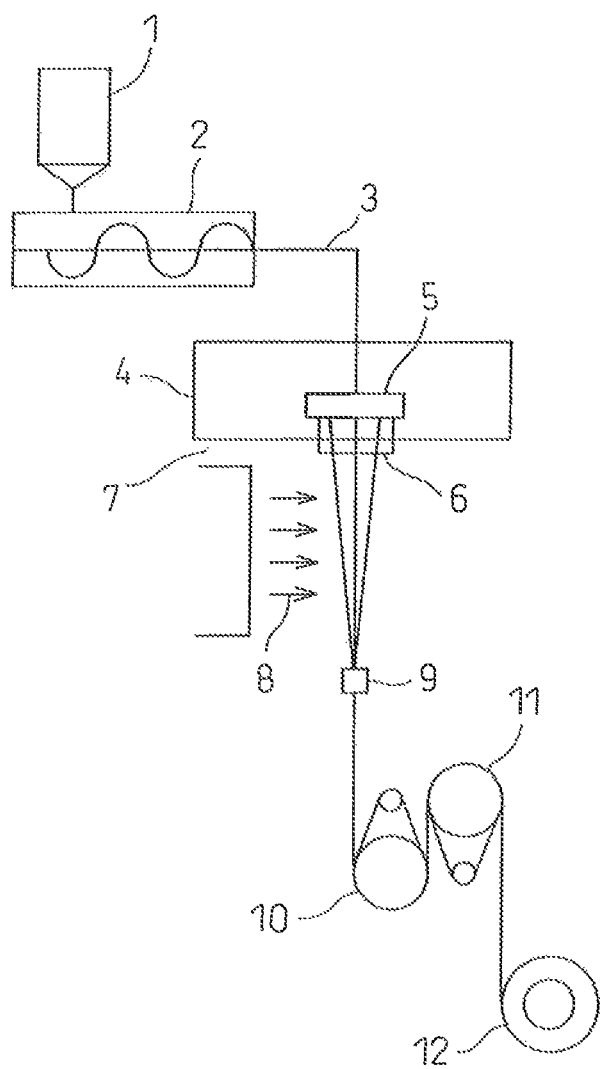
FIG. 7 is a schematic drawing showing one example of an apparatus for spinning, drawing and heat treatment to obtain a drawn yarn of the present invention.

Limiting draw ratio was calculated by sampling a non-drawn yarn, just in front of the first roll (10) in FIG. 7 or FIG. 9, and based on JIS-L-1013 (A test method for chemical fiber filament yarn). Limiting draw ratio (MD) of the non-drawn yarn is represented by MD=(E+100)/100, provided that breaking elongation of the non-drawn yarn is (E).

(5) Spinnability

Spinnability was judged as "A" when yarn, breakage ratio is 5% or lower, and as "F" when yarn breakage ratio is more than 5%, or spinning is impossible, in spinning for 3 days.

(6) Yarn Abrasiveness

Figure 10:
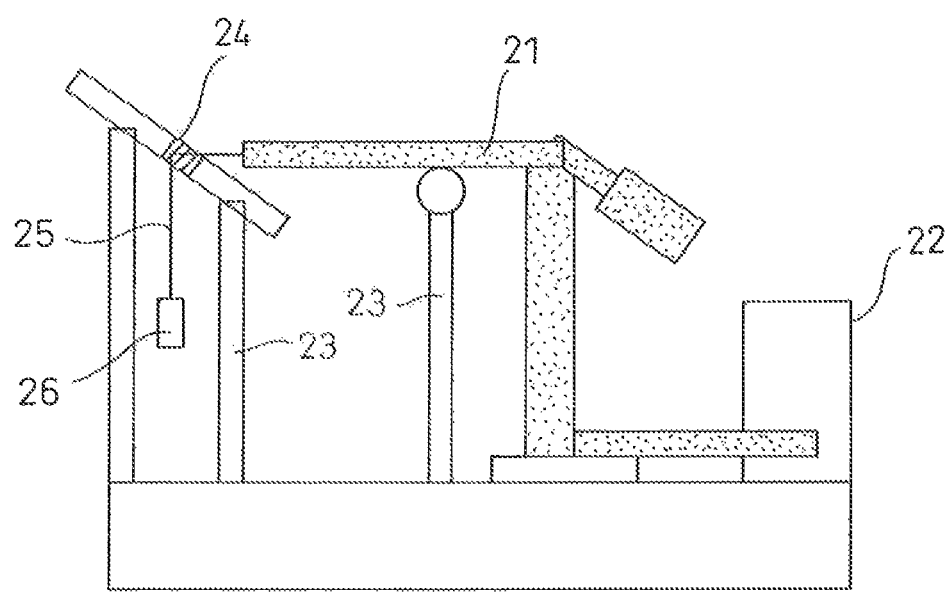
FIG. 10 is a schematic drawing of a yarn abrasion test machine to be used in evaluation of the present invention.

It was evaluated using the yarn abrasion machine shown in FIG. 10, wherein yarns are cut out in 20 cm, and several yarns are assembled so as to attain a total fineness of about 167 dtex, and they are twisted in a degree of 10 times/m. The yarns are contacted, by applying a load of 0.14 g/dtex, with a metal bar having a diameter of 1 cm, and attached with #800 abrasive paper. By giving the yarn friction under condition of a speed of 0.6 times/sec and an amplitude of 3 cm, number of times (1 reciprocation is counted as 1 time) till the yarn breakage is adopted as yarn abrasion times. Friction is performed in a fresh abrasive paper state, by shifting the abrasive paper by each 10 times, so that an abrasive paper state is not changed. Yarn abrasion strength is calculated by the following equation (3):

$$\text{Yarn abrasion strength=Yarn abrasion times/total fineness of the yarn used in the test} \quad (3)$$

(7) The Martindale Abrasion

Abrasion resistance of the woven product was evaluated using the Martindale abrasion test machine, based on JIS-L-1096. It was judged by classification into 5 classes, based on weight reduction ratio after friction, for a friction time of 20000 times. That is, the 5-class evaluation is as follows: 3-class or inferior for the weight reduction ratio of 4% or more; 4-class for the weight reduction ratio of 2% or more and below 4%; and 5-class for the weight reduction ratio of below 2%, when the weight reduction ratio (%) is represented by [(weight of original cloth−weight after friction)/(weight of original cloth)]×100.

(8) ATR Abrasiveness

On the knitted product, an abrasion test was performed based on JIS L1076 (ART method). The following evaluation criteria were used, provided, that abrasion times are 60 times: N (NONE), L (LOW), M (MEDIUM), and H (HIGH).

(9) Texture

Texture was evaluated as "A" when 9 persons or more judged good, among 10 experienced inspectors, and as "F" for other cases. It was evaluated as "AA" when all of 10 inspectors judged particularly soft and superior texture.

Examples 1 to 4, and Comparative Examples 1 and 2

Explanation will be given in these Examples on effect of single yarn fineness on spinnability, abrasion resistance and texture performance.

Production condition in Example 2 is shown below.

The fiber of the present invention having 56 dtex/24 filaments was produced by using a spinning machine as shown in FIG. 7, drawing between a first roll and a second roll, once wound, and then using an apparatus shown in FIG. 8, by performing relaxation heat treatment, between a supply roll and a relaxation roll. Production condition used is as shown, below.

(Spinning Condition)

Limiting viscosity of a polymer: 1.00 dl/g

Pellet drying temperature and moisture content attained: 155° C., 10 ppm

Extruder temperature: 295° C.

Spin head temperature: 300° C.

Spinneret: spinneret having 24 holes, with a diameter of 0.25 mm, per spinneret

Hot distance: 135 mm

Cooling air condition: a temperature of 22° C., a relative humidity of 90%, and a speed of 0.4 m/sec Finishing agent: aqueous emulsion (a concentration of 15% by weight) having a polyether ester as a main component Finishing agent, furnishing ratio: 0.75%

Distance from spinneret to a finishing agent furnishing nozzle: 100 cm (Winding Condition)

The first roll: a speed of 1500 m/min and a temperature of 90° C.:

The second roll: a speed of 3975 m/min and a temperature of 130° C.

Winding machine: SA-608 machine (manufactured by Asahi Engineering Co., Ltd.)

Twill angle: 5.8 degree (Relaxation Heat Treatment)

Supply roll: a speed of 555 m/min and a temperature of 85° C.

Hot plate temperature: 180° C.

Relaxation roll: a speed of 500 m/min, under non-heating (at room, temperature)

Relaxing tension: 0.25 cN/dtex

Relaxation ratio: 9%

Winding amount: 1 kg/l pirn

Properties and evaluation results of the obtained fibers are shown in Table 1. In addition, in Examples 1, 3 and 4, as well as in comparative Examples 1 and 2, fibers were produced under the same condition as in Example 2, except that number of spinnerets, discharge amount and the like were changed, as shown in Table 1.

As is clear from Table 1, fibers obtained in Examples of the present invention show good results in spinnability, yarn abrasion and texture.

In Comparative Example 1, because of smaller single yarn fineness relative to a range specified in the present invention, effect expected by the present invention was not obtained in yarn abrasion, although texture was good.

In Comparative Example 2, because of larger single yarn fineness relative to a range specified in the present invention, texture was rigid and effect expected by the present invention was not obtained, although yarn abrasion was good.

Examples 5 and 6, and Comparative Examples 3 and 4

Explanation will be given here on effect of limiting viscosity.

Fibers of Examples 5 and 6, as well as Comparative Examples 3 and 4 were obtained by performing spinning and winding by changing limiting viscosity of a polymer to be used, in performing similar spinning, drawing and relaxation heat treatment as in Example 2.

Properties and evaluation results of the obtained fibers by each Example and Comparative Example are shown in Table 1.

As is clear from Table 1, fibers obtained in Examples of the present invention show good results in spinnability, yarn abrasion and texture.

In Comparative Example 3, because of lower limiting viscosity relative to a range specified in the present invention, effect expected by the present invention was not obtained in yarn abrasion.

In Comparative Example 4, because of higher, limiting viscosity relative to a range specified in the present invention, texture was deteriorated and effect expected by the present invention was not obtained.

Examples 7 and 3, and Comparative Example 5

Explanation will be given here on effect of draw ratio.

Fibers of 7 and 8, as well as Comparative Example 5 were obtained by changing ratio of draw ratio relative to the limiting draw ratio, and relaxation ratio, in performing similar spinning, drawing and relaxation heat treatment as in Example 2.

Properties and evaluation results of the obtained fibers by each Example and Comparative Example are shown, in Table 1.

As is clear from Table 1, fibers obtained in Examples of the present invention show good results in spinnability, yarn abrasion and texture.

In Comparative Example 5, because of higher limiting draw ratio relative to a range specified in the present invention, spinnability was deteriorated and fiber was not able to obtain.

Examples 9 and 10, and Comparative Examples 5 and 7

Explanation will be given here on effect of heat treatment temperature.

Fibers of Examples 9 and 10, as well as Comparative Examples 6 and 7 were obtained by changing heat treatment temperature, in performing similar spinning, drawing and relaxation heat treatment as in Example 2.

Properties and evaluation results of the obtained, fibers by each Example and Comparative Example are shown in Table 1.

As is clear from Table 1, fibers obtained in Examples of the present invention show good results in spinnability, yarn abrasion and texture.

In Comparative Example 6, because of lower heat treatment temperature relative to a range specified, in the present invention, value of the minimum differential Young's modulus of region having an elongation of 2% to 5% inclusive, was 20 cN/dtex or higher, and effect expected by the present invention was not obtained in yarn abrasion.

In Comparative Example 7, because of higher heat treatment temperature relative to a range specified in the present invention, the process tension decreased and yarn spinnability was deteriorated, and thus the fiber of the present invention was not able to obtain.

Examples 11 to 13, and Comparative Examples 8 to 10

Explanation will be given here on effect, of relaxation ratio in performing relaxation heat treatment.

Fibers with, different relaxation ratio shown in Examples 11 and 12, as well as Comparative Examples 8 to 10 were obtained by changing roll speed involved in relaxation heat treatment, in performing similar spinning, drawing and relaxation heat treatment as in Example 2. In addition, Comparative Example 9 is the fiber obtained by not performing relaxation neat treatment after winding under similar spinning and drawing condition as in Example 2.

Properties and evaluation results of the obtained fibers by each Example and Comparative Example are shown in Table 1.

As is clear from Table 1, fibers obtained, in Examples of the present invention show good results in spinnability, yarn abrasion and texture.

In Comparative Examples 8 and 9, relaxation ratio was smaller relative to a range specified in the present invention, in Comparative Example 8, it was −5%, that is, drawing heat treatment itself was performed, and in Comparative Example 9, relaxation heat treatment was not performed. In these cases, orientation relaxing effect generated by relaxation heat treatment of polyester molecules in the fiber was small, or none, thus providing the minimum differential Young's modulus of 20 cN/dtex or more, and yarn, abrasion property was not enhanced.

In Comparative Examples 10, relaxation ratio was larger relative to a range specified in the present invention, which decreased the process tension during relaxation heat treatment, deteriorating spinnability, therefore the fiber of the present invention was not able to obtain.

In addition, in Example 13, the fiber of the present invention having 56 dtex/24 filaments was produced by using the spinning machine and the winding machine as shown in FIG. 9, by drawing between the first roll and the second roll, and then, without once wounding, by performing relaxation heat treatment, between the second roll and the third roll. Conditions from pellet drying to the second roll were set similarly as in Example 2, and conditions from and subsequent to the third, roll were newly set. The newly set conditions are as shown below.

(Spinning Condition)

Pellet drying temperature and moisture content attained: 155° C., 10 ppm

Extruder temperature: 295° C.

Spin head temperature: 300° C.

Spinneret: spinneret having 24 holes, with a diameter of 0.25 mm, per spinneret

Hot distance: 135 mm

Cooling air condition: a temperature of 22° C., a relative humidity of 90%, and a speed of 0.4 m/sec Finishing agent: aqueous emulsion (a concentration of 15% by weight) having a polyether ester as a main component Finishing agent furnishing ratio: 0.75%

Distance from spinneret to a finishing agent furnishing nozzle: 100 cm (Winding Condition)

The first roll: a speed of 1500 m/min and a temperature of 90° C.

The second roll: a speed of 3975 m/min and a temperature of 130° C.

The third roll: a speed of 3617 m/min and a temperature of 180° C.

Winding machine: SA-608 machine (manufactured by Asahi Engineering Co., Ltd.)

Twill angle: 5.8 degree

TABLE 1

| | Fineness/ number of filament dtex/f | Breaking strength cN/dtex | Breaking elongation % | Minimum differential Young's modulus cN/dtex | Limiting viscosity dl/g | Limiting stretching ratio (MD) | drawing ratio % | Heat treatment temperature ° C. | Relaxing ratio % | Spinna-bility | Yarn abrasion property times | Tex-ture |
|---|---|---|---|---|---|---|---|---|---|---|---|---|
| Example 1 | 24/24 | 4.6 | 34.5 | 2.6 | 0.86 | 3.30 | 80 | 180 | 9 | A | 0.61 | A |
| Example 2 | 56/24 | 4.5 | 33.2 | 5.4 | 0.95 | 3.44 | 77 | 180 | 9 | A | 0.72 | A |
| Example 3 | 84/24 | 4.5 | 32.1 | 9.2 | 1.08 | 3.27 | 75 | 180 | 9 | A | 0.92 | A |
| Example 4 | 56/12 | 4.3 | 32.5 | 10.1 | 0.93 | 3.51 | 74 | 180 | 9 | A | 1.20 | A |
| Example 5 | 56/24 | 4.0 | 34.9 | 3.9 | 0.71 | 3.55 | 84 | 180 | 9 | A | 0.51 | A |
| Example 6 | 56/24 | 5.1 | 32.1 | 8.8 | 1.30 | 3.30 | 68 | 180 | 9 | A | 0.88 | A |
| Example 7 | 56/24 | 4.0 | 42.3 | 8.4 | 0.95 | 3.44 | 65 | 180 | 6 | A | 0.53 | A |
| Example 8 | 56/24 | 5.0 | 26.6 | 2.2 | 0.96 | 3.44 | 85 | 180 | 12 | A | 0.82 | A |
| Example 9 | 56/24 | 4.6 | 32.3 | 5.1 | 0.95 | 3.44 | 77 | 150 | 9 | A | 0.65 | A |
| Example 10 | 56/24 | 4.5 | 35.1 | 9.5 | 0.95 | 3.44 | 77 | 220 | 9 | A | 0.78 | A |
| Example 11 | 56/24 | 4.5 | 32.5 | 9.9 | 0.95 | 3.44 | 77 | 180 | 6 | A | 0.52 | A |
| Example 12 | 56/24 | 4.1 | 37.3 | 1.9 | 0.95 | 3.44 | 77 | 180 | 15 | A | 0.80 | A |
| Example 13 | 56/24 | 4.5 | 34.2 | 5.3 | 0.95 | 3.44 | 77 | 180 | 9 | A | 0.72 | A |
| Comparative Example 1 | 56/96 | 4.8 | 35.2 | 2.1 | 0.94 | 3.22 | 83 | 180 | 9 | A | 0.23 | A |
| Comparative Example 2 | 84/12 | 4.5 | 31.6 | 12.5 | 1.07 | 3.32 | 68 | 180 | 9 | A | 1.35 | F |
| Comparative Example 3 | 56/24 | 3.8 | 27.4 | 1.9 | 0.50 | 3.63 | 87 | 180 | 9 | A | 0.35 | A |
| Comparative Example 4 | 56/24 | 5.2 | 30.3 | 5.5 | 1.40 | 3.25 | 62 | 180 | 9 | A | 0.98 | F |
| Comparative Example 5 | 56/24 | — | — | — | 0.94 | 3.44 | 88 | 150 | 16 | F | — | — |
| Comparative Example 6 | 56/24 | 4.5 | 30.8 | 22.5 | 0.95 | 3.44 | 77 | 100 | 9 | A | 0.39 | A |
| Comparative Example 7 | 56/24 | — | — | — | 0.95 | 3.44 | 77 | 230 | 5 | F | — | — |
| Comparative Example 8 | 56/24 | 4.9 | 17.0 | 60.6 | 0.95 | 3.44 | 77 | 180 | −5 | A | 0.31 | A |
| Comparative Example 9 | 56/24 | 4.6 | 30.1 | 28.3 | 0.95 | 3.44 | 77 | — | 0 | A | 0.37 | A |
| Comparative Example 10 | 56/24 | — | — | — | 0.95 | 3.44 | 77 | 180 | 16 | F | — | — |

(Note)
Draw ratio (%) is ratio relative to limit draw ratio.

Example 14

A polyester filament, having a limiting viscosity of 0.66 and 12 filaments having a round cross-section and 34 dtex, was spun without performing relaxation heat treatment, in accordance with production condition of Example 2, and a woven product, having a ripstop texture with a warp and a weft of 2 mm, was woven using the obtained polyester filament as the warp and the weft, by a water-jet loom weaving machine. The obtained woven product, after scouring, was preset at 190° C. for 60 seconds, under conditions of a width squeezing ratio of 3% and a warp squeezing ratio of 5%, and then dyed using a jet dyeing machine, dried and subjected to final set, by drawing in a degree of smoothing wrinkles at 170° C. for 20 second, and still more calendering treatment at 160° C.

As shown in the following Table 2, characteristics of the obtained woven product was superior in abrasion resistance and texture was also good.

Example 15

Weaving and processing were performed by a similar method as in Example 14, except by using, as a warp and a weft, a polyester filament, having a limiting viscosity of 1.20 and 12 filaments, having a W-type cross-section and 11 dtex, which, was produced without performing relaxation heat treatment in accordance with production condition of Example 2.

As shown in the following Table 2, characteristics of the obtained woven product was superior in abrasion resistance and texture was also good.

Example 16

Weaving and treatment were performed by a similar method as in Example 14, except by using, as a warp, a polyester filament of Example 1, and as a weft, a polyester filament, having a limiting viscosity of 0.68 and 24 filaments of 56 dtex, which was produced without performing relaxation heat treatment in accordance with production condition of Example 2, and except that taffeta was adopted as a knitted texture.

As shown in the following Table 2, characteristics of the obtained woven product was superior in abrasion resistance and texture was also good.

Example 17

A polyester filament, having a limiting viscosity of 0.85 and 12 filaments having a round cross-section and 34 dtex, was spun in accordance with production condition of Example 2, and after once wound, relaxation heat treatment was performed, using the apparatus shown, in FIG. 8, so as to attain a relaxation ratio of 10% at a hot-plate temperature of 160° C. Weaving treatment was performed by a similar method as in Example 1, except by using this yarn, as a warp and a weft. The obtained woven product, after scouring, was preset at 190° C. for 60 seconds, under conditions of a width squeezing ratio of 0% a no a warp squeezing ratio of 0%, and then dyed using a jet dyeing machine, dried and subjected to final set, at 170° C. for 20 second, and still more calendering treatment at 160° C.

As shown, in the following Table 2, characteristics of the obtained woven product was superior in abrasion resistance and texture was also good.

Example 18

Weaving and treatment were performed by a similar method as in Example 17, except by presetting at 190° C. for 60 seconds, under conditions of a width squeezing ratio of 3% and a warp squeezing ratio of 7%. As shown in the following Table 2, properties of the obtained woven product was superior in abrasion resistance and texture was also good.

Example 19

Weaving and treatment were performed by a similar method as in Example 14, except by using a polyester-based filament, having a limiting viscosity of 0.62, which was produced without performing relaxation heat treatment in accordance with production condition of Example 2. As shown in the following Table 2, characteristics of the obtained woven product was superior in abrasion resistance and texture was also good.

Comparative Example 11

Weaving and treatment were performed by a similar method as in Example 14, except by using a polyester filament, having a limiting viscosity of 0.71 and 5 filaments of 7 dtex, which was produced, without performing relaxation heat treatment in accordance with production condition of Example 2.

As shown in the following Table 2, characteristics of the obtained woven product was inferior in abrasion resistance.

Comparative Example 12

Weaving and processed were performed, by a similar method as in Example 17, except by not performing relaxation heat treatment of the yarn, and performing a tentering heat set of 20% (a width squeezing ratio of −20%) at 180° C., during woven product treatment. As shown in the following Table 2, characteristics of the obtained woven product was inferior in abrasion resistance.

Comparative Example 13

A non-drawn polyester yarn, having a limiting viscosity [η] of 0.65 and 36 filaments having a Y cross-section and 265 dtex, was spun in a ratio of 3.3 times, which was subjected, to relaxation heat treatment of 2% at 150° C. After that, liquid interlacing treatment, was performed under condition of a relaxation ratio of 0.6%, and an air pressure of 4 kg/cm². Using this yarn as a warp, and a usual polyester yarn with 84 dtex/36 filaments as a weft, a woven product (warp: 92 yarns/inch, weft: 90 yarns/inch) was prepared using WJL to be subjected, to usual dyeing treatment under a centering ratio of 5% (width squeezing ratio: −5%). As shown in the following Table 2, characteristics of the obtained woven product was inferior in abrasion resistance.

TABLE 2

| | | Yarn property before weaving | | | | Relaxation heat treatment condition in weaving processing | | Yarn property after weaving processing | |
| | | | | | | Relaxing | | | |
| | | Fineness/fillament number dtex/f | Limiting viscosity dl/g | Heat treatment temperature ° C. | Relaxing ratio % | Minimum differential Young's modulus cN/dtex | ratio (warp squeezing/width squeezing) % | Heat treatment temperature ° C. | Fineness/fillament number dtex/f | Limiting viscosity dl/g |
|---|---|---|---|---|---|---|---|---|---|---|
| Example 14 | Warp | 34/12 | 0.86 | — | — | 23 | 5 | 190 | 37/12 | 0.89 |
| | Weft | 34/12 | 0.86 | — | — | 23 | 3 | | 36/12 | 0.89 |
| Example 15 | Warp | 11/10 | 1.20 | — | — | 27 | 5 | 190 | 12/10 | 1.25 |
| | Weft | 11/10 | 1.20 | — | — | 27 | 3 | | 12/10 | 1.25 |
| Example 16 | Warp | 24/24 | 0.86 | 180 | 9 | 2.6 | 5 | 190 | 26/24 | 0.90 |
| | Weft | 56/24 | 0.68 | — | — | 25 | 3 | | 59/24 | 0.72 |
| Example 17 | Warp | 34/12 | 0.85 | 160 | 10 | 4.7 | 0 | — | 37/12 | 0.89 |
| | Weft | 34/12 | 0.85 | 160 | 10 | 4.7 | 0 | | 37/12 | 0.89 |
| Example 18 | Warp | 34/12 | 0.85 | 160 | 10 | 4.7 | 7 | 190 | 37/12 | 0.89 |
| | Weft | 34/12 | 0.85 | 160 | 10 | 4.7 | 3 | | 37/12 | 0.89 |
| Example 19 | Warp | 34/12 | 0.62 | — | — | 25 | 5 | 190 | 37/12 | 0.64 |
| | Weft | 34/12 | 0.62 | — | — | 25 | 3 | | 37/12 | 0.64 |
| Comparative Example 11 | Warp | 7/5 | 0.71 | — | — | 21 | 5 | 190 | 7/5 | 0.73 |
| | Weft | 7/5 | 0.71 | — | — | 21 | 3 | | 7/5 | 0.73 |

TABLE 2-continued

| | | | | | | | | | | | |
|---|---|---|---|---|---|---|---|---|---|---|---|
| Comparative Example 12 | Warp | 34/12 | 0.85 | — | — | 22 | 0 | 180 | 33/12 | 0.87 | |
| | Weft | 34/12 | 0.85 | — | — | 22 | −20 | | 36/12 | 0.87 | |
| Comparative Example 13 | Warp | 80/36 | 0.65 | 150 | 0.2 | 21 | 0 | — | 82/36 | 0.67 | |
| | Weft | 84/36 | 0.60 | — | — | 25 | −5 | | 86/36 | 0.62 | |

| | | Yarn property after weaving processing | | | | | Woven product property | | | Martindale | |
|---|---|---|---|---|---|---|---|---|---|---|---|
| | | Breaking strength cN/dtex | Breaking elongation % | Minimum differential Young's modulus cN/dtex | Crystallinity % | Orientation degree % | Density piece/ inch | Texture | Mass per unit area g/cm² | Yarn abrasion strength times | abrasion property weight reduction ratio % | Texture |
| Example 14 | Warp | 4.6 | 31.0 | 2.2 | 69 | 0.80 | 140 | Ripstop | 44 | 0.65 | 0.01 | A |
| | Weft | 4.7 | 30.0 | 2.5 | 70 | 0.81 | 137 | | | 0.63 | | |
| Example 15 | Warp | 4.8 | 30.5 | 2.5 | 68 | 0.83 | 245 | Ripstop | 24 | 0.55 | 2.5 | AA |
| | Weft | 4.8 | 30.0 | 2.5 | 68 | 0.83 | 245 | | | 0.55 | | |
| Example 16 | Warp | 4.5 | 33.0 | 3.8 | 70 | 0.83 | 188 | Taffeta | 42 | 0.60 | 1.8 | A |
| | Weft | 4.5 | 32.0 | 4.7 | 70 | 0.84 | 115 | | | 0.53 | | |
| Example 17 | Warp | 4.4 | 31.5 | 5.5 | 69 | 0.82 | 135 | Ripstop | 42 | 0.67 | 0.01 | A |
| | Weft | 4.4 | 31.0 | 5.8 | 69 | 0.83 | 132 | | | 0.65 | | |
| Example 18 | Warp | 4.3 | 33.0 | 2.2 | 69 | 0.79 | 132 | Ripstop | 44 | 0.75 | 0.01 | A |
| | Weft | 4.3 | 33.0 | 2.6 | 69 | 0.80 | 130 | | | 0.75 | | |
| Example 19 | Warp | 4.0 | 29.0 | 4.4 | 68 | 0.85 | 140 | Ripstop | 38 | 0.52 | 6.2 | A |
| | Weft | 3.9 | 29.5 | 4.2 | 68 | 0.86 | 138 | | | 0.52 | | |
| Comparative Example 11 | Warp | 4.2 | 31.0 | 3.6 | 70 | 0.86 | 296 | Ripstop | 20 | 0.37 | 11 | AA |
| | Weft | 4.2 | 31.0 | 3.6 | 70 | 0.86 | 296 | | | 0.37 | | |
| Comparative Example 12 | Warp | 5.1 | 26.0 | 23 | 76 | 0.95 | 140 | Ripstop | 38 | 0.45 | 8.5 | A |
| | Weft | 4.6 | 29.0 | 28 | 73 | 0.92 | 137 | | | 0.41 | | |
| Comparative Example 13 | Warp | 4.1 | 33.0 | 24 | 67 | 0.94 | 92 | Taffeta | 85 | 0.43 | 5.5 | A |
| | Weft | 4.2 | 33.0 | 26 | 67 | 0.93 | 90 | | | 0.44 | | |

Example 20

False twisting was performed under condition of a yarn speed of 577 m/min, a draft of 1.75, and at 190° C., using an 1H false twisting machine, on a polyester filament, having a limiting viscosity [η] of 0.75 and 48 filaments having a round cross-section and 166 dtex, produced in accordance with production condition of Example 2, without performing relaxation heat treatment. After that, a knitted cloth with a four-stage smooth texture was prepared using a double knitting machine. The obtained knitted product, after scouring, was preset at 200° C. for 30 seconds, under conditions of a width squeezing ratio of 10%, and then dyed using a usual method by a jet dyeing machine, dried and subjected to final set, by setting a width in a degree of smoothing wrinkles, at 170° C. for 20 second.

As shown in the following Table 3, characteristics of the obtained knitted product was superior in abrasion resistance and texture was also good.

Example 21

Knitting and treatment were performed by a similar method as in Example 1, except by using a polyester filament, having a limiting viscosity [η] of 0.85 and 12 filaments having a round cross-section and 34 dtex, which was produced without performing relaxation heat treatment in accordance with production condition of Example 2.

As shown in the following Table 3, characteristics of the obtained knitted product was superior in abrasion resistance and texture was also good.

Example 22

Meshed knitting cloth was prepared by using, at the front side, a polyester filament, having a limiting viscosity [η] of 0.70 and 24 filaments of 84 dtex, which was produced without, performing relaxation heat treatment in accordance with production condition of Example 2; and by using, at the back side, a polyester textured yarn (false twisting at 210° C.), having a limiting viscosity [η] of (3.56 and 72 filaments of 34 dtex. The obtained knitted product, after scouring, was preset at 200° C. for 30 seconds, under conditions of a width squeezing ratio of 10%, and then dyed using a usual method by a jet dyeing machine, dried and subjected to final set, by setting a width in a degree of smoothing wrinkles, at 170° C. for 20 second.

As shown in the following Table 3, characteristics of the obtained knitted product was superior in abrasion resistance and texture was also good.

Example 23

A knitted cloth was prepared having a tricot half texture, by using a 28GG tricot knitting machine, by adopting at the front, a polyester textured yarn, having a limiting viscosity [η] of 0.75, and having a W-type cross-section, with 30 filaments of 56 dtex, produced in accordance with production condition of Example 2, and without performing relaxation heat treatment; at the middle, a polyester textured yarn, having a limiting viscosity [η] of 0.68, and having a round-type cross-section, with 24 filaments of 56 dtex; and at the back side, a polyurethane fiber of 44 dtex. A knitted cloth having a mass per unit area of 255 g/m² was obtained by treatment similarly as in Example 20. As shown in the following Table 3, characteristics of the obtained knitted product was superior in abrasion resistance and texture was also good, when measured by using a surface composed of yarns supplied from, a front reed, as a front surface.

Example 24

A polyester filament, having a limiting viscosity of 0.85 and 24 filaments having a round cross-section and 84 dtex, was spun, and after once wound, relaxation heat treatment was performed, using the apparatus shown in FIG. 8, so as to attain a relaxation ratio of 10% at a hot-plate temperature of 160° C.

False twisting was performed, under condition of a yarn speed of 577 m/min, a draft of 1.75, and at 190° C., using a 1H false twisting machine. After that, a knitted cloth with a four-stage smooth texture was prepared using a double knitting machine. The obtained knitted product, after scouring, was preset at 200° C. for 30 seconds, under conditions of a width squeezing ratio of 10%, and then dyed using a usual method by a jet dyeing machine, dried and then subjected to final set, by setting a width in a degree of smoothing wrinkles, at 170° C. for 20 second. As shown in the following Table 3, characteristics of the obtained knitted product was superior in abrasion resistance and texture was also good.

Comparative Example 14

False twisting of a polyester fiber was performed similarly as in Example 20, except that temperature at 2H was set at 210° C./150° C.

As shown in the following Table 3, characteristics of the obtained knitted product was inferior in abrasion resistance.

Comparative Example 15

A knitted product was knitted, and processed similarly as in Example 20, except by using a polyester filament, having a limiting viscosity [η] of 0.56 and 12 filaments of 17 dtex, which was produced without performing relaxation heat treatment in accordance with, production, condition of Example 2.

As shown, in the following Table 3, characteristics of the obtained knitted product was inferior in abrasion resistance.

Comparative Example 16

A knitted product was knitted and processed similarly as in Example 20, except by using a polyester filament, having a limiting viscosity [η] of 0.75 and 144 filaments of 84 dtex, produced without performing relaxation heat treatment in accordance with production condition of Example 2.

As shown in the following Table 3, characteristics of the obtained knitted product was inferior in abrasion resistance.

Comparative Example 17

A knitted product was knitted and processed similarly as in Example 22, except that preset, of Example 2 was performed at 190° C. under a festering ratio of 20% (width squeezing ratio: −20%).

As shown in the following Table 3, characteristics of the obtained knitted, product was inferior in abrasion resistance.

TABLE 3

| | Yarn property before tentative twisting | | | | | false twisting condition | | Relaxation heat treatment condition in knitting processing | | Yarn property of knitted product |
|---|---|---|---|---|---|---|---|---|---|---|
| | Fineness/ number of fillament at measurement surface | Limiting viscosity dl/g | Heat treatment temperature ° C. | Relaxing ratio % | Minimum differential Young's modulus cN/dtex | Type | Temperature ° C. | Relaxing ratio (warp squeezing/width squeezing) % | Heat treatment temperature ° C. | Fineness/ number of fillament at measurement surface |
| Example 20 | 166/48 | 0.75 | — | — | 25 | 1H | 190 | 10 | 200 | 169/48 |
| Example 21 | 34/12 | 0.85 | — | — | 23 | 1H | 190 | 10 | 200 | 37/12 |
| Example 22 | 84/24 | 0.70 | — | — | 25 | — | — | 10 | 200 | 88/24 |
| Example 23 | 56/30 | 0.75 | — | — | 26 | — | — | 10 | 200 | 59/30 |
| Example 24 | 84/24 | 0.85 | 160 | 10 | 3.8 | 1H | 190 | 10 | 200 | 89/24 |
| Comparative Example 14 | 166/48 | 0.75 | — | — | 25 | 2H | 210 | 10 | 200 | 173/48 |
| Comparative Example 15 | 17/12 | 0.56 | — | — | 21 | 1H | 190 | 10 | 200 | 19/12 |
| Comparative Example 16 | 84/144 | 0.75 | — | — | 22 | 1H | 190 | 10 | 200 | 88/144 |
| Comparative Example 17 | 84/24 | 0.70 | — | — | 25 | — | — | −20 | 200 | 87/24 |

| | Yarn property of knitted product | | | | | | Knitted product property | | | |
|---|---|---|---|---|---|---|---|---|---|---|
| | Limiting viscosity dl/g | Breaking strength cN/dtex | Breaking elongation % | Minimum differential Young's modulus cN/dtex | Crystallinity % | Orientation degree % | Masst per unit area g/cm² | Yarn abrasion strength times | ART abrasion property class | Texture |
| Example 20 | 0.78 | 4.6 | 31.0 | 2.7 | 68 | 0.91 | 290 | 0.84 | N-L | A |
| Example 21 | 0.89 | 4.8 | 30.5 | 2.9 | 69 | 0.90 | 110 | 0.67 | L | AA |
| Example 22 | 0.74 | 4.3 | 32.0 | 4.1 | 67 | 0.84 | 177 | 0.63 | L | A |
| Example 23 | 0.79 | 4.5 | 31.5 | 5.5 | 68 | 0.86 | 255 | 0.58 | L | A |
| Example 24 | 0.87 | 4.3 | 34.0 | 2.1 | 69 | 0.85 | 180 | 0.70 | N-L | A |
| Comparative Example 14 | 0.79 | 4.4 | 29.0 | 21 | 69 | 0.94 | 295 | 0.45 | M | A |
| Comparative Example 15 | 0.58 | 4.0 | 31.0 | 3.9 | 69 | 0.91 | 90 | 0.06 | M-H | AA |

TABLE 3-continued

| | | | | | | | | | | |
|---|---|---|---|---|---|---|---|---|---|---|
| Comparative Example 16 | 0.79 | 4.8 | 28.0 | 4.7 | 68 | 0.91 | 182 | 0.05 | H | A |
| Comparative Example 17 | 0.73 | 4.9 | 27.0 | 36 | 67 | 0.95 | 177 | 0.38 | M | A |

INDUSTRIAL APPLICABILITY

Because the present invention is capable of providing the polyester fiber having good abrasion resistance and is particularly suitable for a thin cloth woven/knitted product, and the woven/knitted product containing said fiber, the woven product using such a fiber provides a clothing which is difficult to generate fuzz or tearing caused by rubbing at side parts or thigh parts in wearing a clothing, in particular, in wearing an outdoor clothing such as a windbreaker, a down jacket, which is strong against severe contact friction with a clothing itself or other objects generating in wearing as a sports wear or an outdoor wear, and has superior texture. In addition, it can also be attained to make light weight and thin cloth of clothing, requiring such abrasion resistance.

REFERENCE SIGNS LIST

1 Polymer dryer
2 Extruder
3 Bend
4 Spin head
5 Spin pack
6 Spinneret
7 Non-bias ting region
8 Cooling air
9 Finishing agent furnishing nozzle
10 First roll
11 Second roll
12 Fiber cheese
13 Fiber cheese
14 Supply roll
15 Hot-plate
16 Relaxation roll
17 Guide
18 Traveler guide
19 Fiber pirn
20 Third roll
21 Movable arm
22 Motor
23 Supporting rod
24 Abrasive paper
25 Sample
26 Load

The invention claimed is:

1. A method for producing an abrasion resistant polyester fiber comprising ethylene terephthalate in 95% by mole or more, as a repeating unit, characterized by satisfying the following requirements (1) to (5):
   (1) a fineness is 8 dtex to 200 dtex inclusive;
   (2) a single yarn fineness is 1.0 dtex to 4.0 dtex inclusive;
   (3) a breaking strength is 3.5 cN/dtex or higher;
   (4) a breaking elongation is 30% to 50% inclusive; and
   (5) a minimum differential Young's modulus of region having an elongation of 2% to 5% inclusive in a stress-strain curve of the fiber, is 20 cN/dtex or lower, the method comprising the following steps of:
   melt spinning a polyester having a limiting viscosity of 0.70 dl/g to 1.30 dl/g inclusive;
   performing drawing treatment under a draw ratio of 65% to 84% inclusive of the limiting draw ratio; and
   performing relaxation heat treatment at a heat treatment temperature of 120° C. to 220° C. inclusive, and a relaxation ratio of 5% to 15% inclusive.

2. The method according to claim 1, wherein after drawing treatment and winding once, then the relaxation heat treatment is performed.

3. The method according to claim 1, wherein the relaxation heat treatment is performed subsequent to drawing treatment without winding once.

4. The method according to claim 1, wherein the relaxation heat treatment is performed in setting at a dyeing processing step.

5. The method according to claim 4, wherein the relaxation heat treatment of the woven product, comprising the polyester fiber false twisted at 180 to 200° C. inclusive, is performed at temperature higher than false twisting temperature.

6. The method according to claim 4, wherein the relaxation heat treatment of the knitted product, comprising the polyester fiber false twisted at 180 to 200° C. inclusive, is performed at temperature equal to or higher than false twisting temperature.

7. The method according to claim 1, wherein the drawing treatment is performed under a draw ratio of 65% to 80% inclusive of the limiting draw ratio.

* * * * *